(12) United States Patent
Li et al.

(10) Patent No.: US 8,005,033 B2
(45) Date of Patent: Aug. 23, 2011

(54) DEVICE, SYSTEM, AND METHOD OF BIDIRECTIONAL WIRELESS COMMUNICATION

(75) Inventors: Qinghua Li, Sunnyvale, CA (US); Xintian E. Lin, Mountain View, CA (US)

(73) Assignee: Intel Corporation, Santa Clara, CA (US)

( * ) Notice: Subject to any disclaimer, the term of this patent is extended or adjusted under 35 U.S.C. 154(b) by 875 days.

(21) Appl. No.: 12/023,057

(22) Filed: Jan. 31, 2008

(65) Prior Publication Data

US 2009/0196214 A1 Aug. 6, 2009

(51) Int. Cl.
*H04J 1/10* (2006.01)
(52) U.S. Cl. ........................................................ 370/315
(58) Field of Classification Search ........................ None
See application file for complete search history.

(56) References Cited

U.S. PATENT DOCUMENTS

| 7,920,501 B2 * | 4/2011 | Larsson et al. ................ 370/315 |
| 2008/0219251 A1 | 9/2008 | Xue et al. |
| 2009/0185521 A1 | 7/2009 | Li |

OTHER PUBLICATIONS

Dina Katabi, "Practical Wireless Network Coding," MIT presentation, May 2007.

* cited by examiner

*Primary Examiner* — Raj Jain
(74) *Attorney, Agent, or Firm* — Shiloh et al.

(57) ABSTRACT

Device, system and method of bidirectional wireless communication. In some demonstrative embodiments a method may include, for example, receiving by a wireless communication relay node a superimposed transmission corresponding to first and second transmissions from first and second wireless communication nodes, respectively, wherein the first transmission includes a first packet intended at least for a third wireless communication node; and broadcasting a broadcast transmission including the superimposed transmission from the relay node to a set of two or more wireless communication nodes including the third wireless communication node. Other embodiments are described and claimed.

8 Claims, 4 Drawing Sheets

DEVICE, SYSTEM, AND METHOD OF BIDIRECTIONAL WIRELESS COMMUNICATION

BACKGROUND

Bidirectional wireless communication is commonly used in many wireless communication applications, e.g., voice, mesh, backbone, and the like. It is desired to achieve a relatively high throughput of the bidirectional communications.

A bidirectional wireless communication scheme may be implemented, for example, to wirelessly exchange first and second packets, denoted a and b, respectively, between first and second nodes, denoted A and B, respectively. For example, during a first time slot, node A sends the packet a to a relay station, denoted R; during a second time slot node B sends the packet b to relay station R; during a third time slot the relay station R applies a modulo two operation on binary field (XOR) operation to the packets a and b, and broadcasts the result of the XOR operation to both nodes A and B. After reception of the broadcast packet, node A may decode the packet b by applying a XOR operation to the received packet and the packet a; and node B may decode the packet a by applying a XOR operation to the received packet and the packet b.

BRIEF DESCRIPTION OF THE DRAWINGS

For simplicity and clarity of illustration, elements shown in the figures have not necessarily been drawn to scale. For example, the dimensions of some of the elements may be exaggerated relative to other elements for clarity of presentation. Furthermore, reference numerals may be repeated among the figures to indicate corresponding or analogous elements. The figures are listed below.

DETAILED DESCRIPTION

Figure 1:
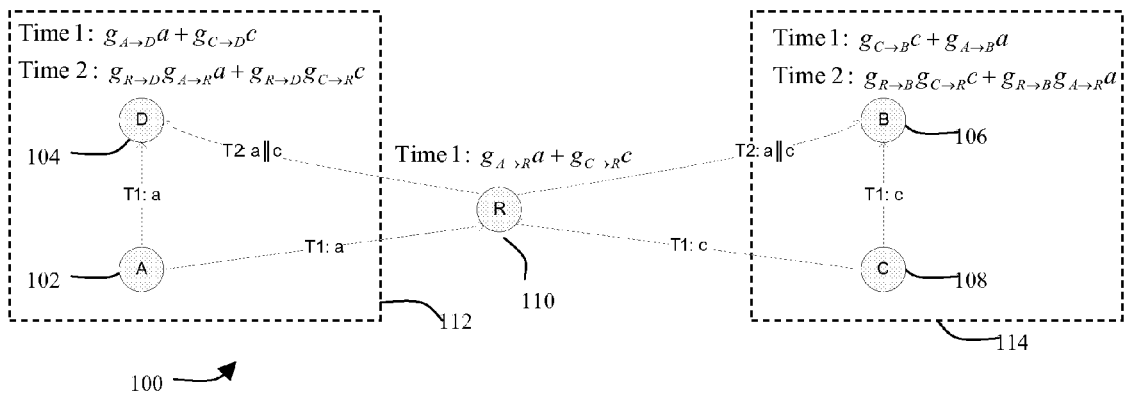
FIG. 1 is a schematic block diagram illustration of a wireless communication system in accordance with one demonstrative embodiment.

In the following detailed description, numerous specific details are set forth in order to provide a thorough understanding of some embodiments. However, it will be understood by persons of ordinary skill in the art that embodiments of the invention may be practiced without these specific details. In other instances, well-known methods, procedures, components, units and/or circuits have not been described in detail so as not to obscure the discussion.

Discussions herein utilizing terms such as, for example, "processing," "computing," "calculating," "determining," "establishing", "analyzing", "checking", or the like, may refer to operation(s) and/or process(es) of a computer, a computing platform, a computing system, or other electronic computing device, that manipulate and/or transform data represented as physical (e.g., electronic) quantities within the computer's registers and/or memories into other data similarly represented as physical quantities within the computer's registers and/or memories or other information storage medium that may store instructions to perform operations and/or processes. The terms "plurality" and "a plurality" as used herein includes, for example, "multiple" or "two or more". For example, "a plurality of items" includes two or more items.

Some embodiments may be used in conjunction with various devices and systems, for example, a Personal Computer (PC), a desktop computer, a mobile computer, a laptop computer, a notebook computer, a tablet computer, a server computer, a handheld computer, a handheld device, a Personal Digital Assistant (PDA) device, a handheld PDA device, an on-board device, an off-board device, a hybrid device, a vehicular device, a non-vehicular device, a mobile or portable device, a non-mobile or non-portable device, a wireless communication station, a wireless communication device, a wireless Access Point (AP), a wired or wireless router, a wired or wireless modem, a wired or wireless network, a Local Area Network (LAN), a Wireless LAN (WLAN), a Metropolitan Area Network (MAN), a Wireless MAN (WMAN), a Wide Area Network (WAN), a Wireless WAN (WWAN), a Personal Area Network (PAN), a Wireless PAN (WPAN), One way and/or two-way radio communication systems, cellular radio-telephone communication systems, a cellular telephone, a wireless telephone, a Personal Communication Systems (PCS) device, a PDA device which incorporates a wireless communication device, a mobile or portable Global Positioning System (GPS) device, a device which incorporates a GPS receiver or transceiver or chip, a device which incorporates an RFID element or chip, a Multiple Input Multiple Output (IMO) transceiver or device, a wired or wireless handheld device (e.g., BlackBerry, Palm Treo), a Wireless Application Protocol (WAP) device, or the like. Types of WLAN and/or WMAN communication systems intended to be within the scope of the present invention include, although are not limited to, WLAN and/or WMAN communication systems as described by "IEEE-Std 802.16, 2004 Edition, Air Interface for Fixed Broadband Wireless Access Systems" standard ("the 802.16 standard"), and more particularly in "IEEE-Std 802.16j, Amendment to IEEE Standard for Local and Metropolitan Area Networks—Part 16: Air Interface for Fixed and Mobile Broadband Wireless Access Systems— Multihop Relay Specification", "IEEE-Std 802.16m, Air Interface for Fixed Broadband Wireless Access Systems— Advanced Air Interface", and the like, and/or future versions and/or derivatives and/or Long Term Evolution (LTE) of the above standards.

Some embodiments may be used in conjunction with one or more types of wireless communication signals and/or systems, for example, Radio Frequency (RF), Infra Red (IR), Frequency-Division Multiplexing (FDM), Orthogonal FDM (OFDM), Time-Division Multiplexing (TDM), Time-Division Multiple Access (TDMA), Extended TDMA (E-TDMA), General Packet Radio Service (GPRS), extended GPRS, Code-Division Multiple Access (CDMA), Wideband CDMA (WCDMA), CDMA 2000, Multi-Carrier Modulation (MDM), Discrete Multi-Tone (DMT), Bluetooth, Global Positioning System (GPS), Wi-Fi, Wi-Max, ZigBeeM, WilD, Ultra-Wideband (UWB), Global System for Mobile communication (GSM), Enhanced Data GSM Environment (EDGE), 2G, 2.5G, 3G, 3.5G, or the like. Some embodiments may be used in various other devices, systems and/or networks.

Reference is now made to FIG. 1, which schematically illustrates a bidirectional wireless communication system 100 in accordance with one demonstrative embodiment.

In some demonstrative embodiments, communication system 100 may include a first node 102, denoted A; a second node 104, denoted D; a third node 106, denoted B; a fourth node 108, denoted C; and a relay node 110, denoted R, as described in detail below.

In some demonstrative embodiments, nodes 102 and 104 may be part of a first neighborhood 112, e.g., a first wireless communication cell; nodes 106 and 108 may be part of a second neighborhood 114, e.g., a second wireless communication cell. Relay node 110 may be located, for example, between neighborhoods 112 and 114, e.g., at substantially equal distances from neighborhoods 112 and 114. Accordingly, nodes 102 and/or 104 may not be able to directly communicate with nodes 106 and/or 108.

In some demonstrative embodiments, system 100 may exchange a first packet, denoted a, from node 102 to node 106; and a second packet, denoted c, from node 108 to node 104 via relay node 110, for example, during two communication time periods ("slots"), e.g., as described below.

In some demonstrative embodiments, during a first time slot, denoted T1, nodes 102 and 108 may transmit the packets a and c, respectively, to relay node 110, e.g., substantially simultaneously. In some demonstrative embodiments, node 104 may overhear the transmission of packet a; and/or node 106 may overhear the transmission of packet c.

In some demonstrative embodiments, nodes 104 and 106 may decode the packets a and c, respectively, e.g., as described below. For example, node 104 may be subject to a relatively low interference resulting from the transmission of the packet c from node 108 to relay node 110, e.g., since relay node 110 and node 108 may be at a greater distance from node 104 compared to the distance between nodes 102 and 104. Node 106 may be subject, for example, to a relatively low interference resulting from the transmission of the packet a from node 102 to relay node 110, e.g., since relay node 110 and node 102 may be at a greater distance from node 106 compared to the distance between nodes 106 and 108. For example, during the time slot T1 node 104 may overhear a signal equal to the superimposition of the packets a and c, e.g., $g_{A \to D}a + g_{C \to D}c$, wherein $g_{A \to D}$ denotes a channel response between the nodes A and D, and $g_{C \to D}$ denotes a channel response between the nodes C and D; and node 106 may overhear a signal equal to the superimposition of the packets a and c, e.g., $g_{A \to B}a + g_{C \to B}c$, wherein $g_{A \to B}$ denotes a channel response between the nodes A and B, and $g_{C \to B}$ denotes a channel response between the nodes C and B.

In some demonstrative embodiments, during the time slot T1 relay node 110 may receive the superimposed transmission $g_{A \to R}a + g_{C \to R}c$, wherein $g_{A \to R}$ denotes a channel response between the nodes A and R, and $g_{C \to R}$ denotes a channel response between the nodes C and R.

In some demonstrative embodiments, during a second time slot, denoted T2, following the time slot T1, relay node 110 may broadcast the superimposed transmission $g_{A \to R}a + g_{C \to R}c$ to both nodes 104 and 106. Accordingly, in the time slot T2 node 106 may receive the transmission $g_{R \to B}g_{C \to R}c + g_{R \to B}g_{A \to R}a$, wherein $g_{R \to B}$ denotes a channel response between the nodes R and B; and node 104 may receive the transmission $g_{R \to D}g_{A \to R}a + g_{R \to D}g_{C \to R}c$, wherein $g_{R \to D}$ denotes a channel response between the nodes R and D.

In the above description, a channel response, denoted $g_{X \to Y}$, between a first node, denoted X, and a second node, denoted Y, may include an effect of the transmission power from the node X. The channel response $g_{X \to Y}$ may be greater than a concatenated channel response, denoted $g_{Y \to X}g_{X \to Y}$, wherein $g_{Y \to Z}$ denotes a channel response between the node Y and a third node, denoted Z, if, for example, the effect of the transmission power is not included, since substantially any channel response may have a value which is less than one.

The channel response $g_{X \to Y}$ may include a scalar, for example, if one transmit antenna and one receive antenna are implemented. The channel response $g_{X \to Y}$ may include a vector, for example, if one transmit antenna and multiple receive antennas, or multiple transmit antennas and one receive antenna are implemented. The channel response $g_{X \to Y}$ may include a matrix, for example, if multiple transmit antennas and multiple receive antennas are implemented.

In some demonstrative embodiments, node 106 may detect the packet c based on the transmission $g_{C \to B}c + g_{A \to B}a$ overheard by node 106 during the time slot T1 and/or the signal $g_{R \to B}g_{C \to R}c + g_{R \to B}g_{A \to R}a$ received by node 106 during the time slot T2. For example, node 106 may detect the packet c by performing hybrid automatic repeat request (H-ARQ) combining over the transmissions $g_{C \to B}c + g_{A \to B}a$ and $g_{R \to B}g_{C \to R}c + g_{R \to B}g_{A \to R}a$. Node 104 may detect the packet a based on the transmission $g_{A \to D}a + g_{C \to D}c$ overheard by node 104 during the time slot T1 and/or the signal $g_{R \to D}g_{A \to R}a + g_{R \to D}g_{C \to R}c$ received by node 104 during the time slot T2. For example, node 104 may detect the packet a by performing H-ARQ combining over the transmissions $g_{A \to D}a + g_{C \to D}c$ and $g_{R \to D}g_{A \to R}a + g_{R \to D}g_{C \to R}c$.

In some demonstrative embodiments, node 106 may decode the packet a based on the decoded packet c, and/or node 104 may decode the packet c based on the decoded packet a.

In some demonstrative embodiments, node 106 may treat the superimposed signal $g_{R \to B}g_{C \to R}c + g_{R \to B}g_{A \to R}$ as a combination of a transmission of the packet a over a channel having a channel response $g_{R \to B}g_{A \to R}$ ("the packet transmission"), an interfering transmission of the packet c over a channel having a channel response $g_{R \to B}g_{C \to R}$ ("the interfering transmission"). Node 106 may implement any suitable interference mitigation scheme or method to reduce or cancel the interfering transmission to the packet transmission. In one example, node 106 may detect the packet c, e.g., as described above. The channel response $g_{R \to B}g_{C \to R}$ may be estimated by node 106, e.g., by treating the data of the detected packet c as training pilots, and treating the packet transmission as noise. After estimating the channel response $g_{R \to B}g_{C \to R}$, node 106 may reconstruct the interfering transmission, for example, by applying the estimated channel response $g_{R \to B}g_{C \to R}$ to the detected packet c. The reconstructed interfering signal, $g_{R \to B}g_{C \to R}c$, may be subtracted from the superimposed transmission $g_{R \to B}g_{C \to R}c + g_{R \to B}g_{A \to R}a$. Node 106 may then detect the packet a using any suitable detection method.

In some demonstrative embodiments, node 106 may estimate the channel responses $g_{R \to B}g_{C \to R}$ affecting the packet c in the superimposed transmission $g_{R \to B}g_{C \to R}c + g_{R \to B}g_{A \to R}a$, and the channel response $g_{C \to B}$ affecting the packet c in the overheard transmission $g_{C \to B}c + g_{A \to B}$.

In some demonstrative embodiments, node 106 may receive two sets of transmissions containing information about the packet a, e.g., the transmissions $g_{R \to B}g_{C \to R}c + g_{R \to B}g_{A \to R}a$ and $g_{C \to B}c + g_{A \to B}a$, as described above.

In some demonstrative embodiments, node 106 may treat the packet a as interference in both transmissions $g_{R \to B}g_{C \to R}c + g_{R \to B}g_{A \to R}a$ and $g_{C \to B}c + g_{A \to B}a$, to determine any suitable detection information relating to the packet c. For example, node 106 may estimate the channel responses $g_{R \to B}g_{C \to R}$ and $g_{C \to B}$. For example, node 106 may determine for each codebit of the packet c two log-likelihood ratios based on the transmissions $g_{R \to B}g_{C \to R}c + g_{R \to B}g_{A \to R}a$ and $g_{C \to B}c + g_{A \to B}a$, respectively. Node 106 may use the detection information of the two transmissions to decode the packet c. For example, the two log-likelihood ratios of each codebit of the packet c may be combined to generate a combined log-likelihood ratio of the codebit. The combined log-likelihood ratios may be used by a channel decoder to decode the information bits of the packet c. Node 106 ay obtain a relatively good and rough estimate of the packet c based on the transmission $g_{C \to B}c + g_{A \to B}a$, by treating $g_{A \to B}a$ as noise, for example, since the channel response $g_{C \to B}c$ may be stronger than the channel response $g_{A \to B}a$ in the transmission $g_{C \to B}c + g_{A \to B}a$. The rough estimate of the packet c may be used to help the channel estimation of $g_{C \to B}g_{C \to R}$ in the transmission $g_{R \to B}g_{C \to R}c + g_{R \to B}g_{A \to R}a$. For example, the rough estimate of packet c may be treated as the exact and the packet c in the transmission $g_{R \to B}g_{C \to R}c + g_{R \to B}g_{A \to R}a$ may be treated as channel sounding for the channel $g_{R \to B}g_{C \to R}$.

in some demonstrative embodiments, node 106 may reconstruct the interference signal from the packet c using the decoded information bits of packet c; remove the interference for the received signals $g_{R \to B}g_{C \to R}c + g_{R \to B}g_{A \to R}a$ and $g_{C \to B}c + g_{A \to B}a$; and obtain the interference-free signals $g_{R \to B}g_{A \to R}a$ and $g_{A \to B}a$.

In some demonstrative embodiments, each of the two interference-free signals may include, e.g., separately, detection information of the packet a, e.g., log-likelihood ratio of codebits of the packet a. The detection information of the two interference-free signals may be combined to detect the data in packet a. For example, the two log-likelihood ratios of each codebit may be combined to generate a combined log-likelihood ratio of the codebit; and the combined log-likelihood ratios may be used, e.g., by the channel decoder, to decode the information bit in the packet a.

In some demonstrative embodiments the above-described operations may be repeated by node 106, e.g., iteratively. For example, after removing the interferences from the packet a in $g_{R \to B}g_{C \to R}c + g_{R \to B}g_{A \to R}a$ and $g_{C \to B}c + g_{A \to B}a$, e.g., using the decoded information about the packet a, node 106 may re-decode packet c. Optimum performance may be achieved, for example, by the joint detection and channel estimation of packets a and c and channels $g_{R \to B}g_{C \to R}$, $g_{R \to B}g_{A \to R}$, $g_{C \to B}$, $g_{A \to B}$ using the two signals $g_{R \to B}g_{C \to R}c + g_{R \to B}g_{A \to R}a$ and $g_{C \to B}c + g_{A \to B}a$. However, the joint process may be of high complexity.

In some demonstrative embodiments, relay node 110 may not be required to decode the packets transmitted by nodes 102 and 108 during the time slot T1. A transmit power of relay node 110 is shared by the broadcast transmission to both nodes 104 and 106. Accordingly, the power of the broadcast transmission received by nodes 104 and 106 may be reduced by 50% compared to a conventional bidirectional communication scheme. Since channel capacity is a concave function of signal power, the time slot reduction compared to the conventional communication scheme may compensate for the power reduction resulting in the transmissions received by nodes. Although the above description relates to a single relay node 110, in other embodiments multiple relay nodes may be implemented, e.g., to increase performance. For example, the multiple relay stations may substantially simultaneously receive and transmit each signal, and the received power at the destination stations may be increased, for example, as a factor of the number of relay stations. Additionally or alternatively, Multiple-input Multiple-Output (IMO) antenna schemes may be implemented. In such case, the scalar channel and scalar signal are replaced by channel matrix and signal vector respectively.

In some demonstrative embodiments, nodes 102 and 104 may be combined as part of node A, and nodes 106 and 108 may be combined as part of node B. Accordingly, nodes A and B may simultaneously transmit the packets a and c to relay node 110 during the time slot T1. Relay node 110 may then broadcast the superimposed transmission to both nodes A and B during the time slot T2. The signal to noise ratio (SNR) associated with the nodes A, B, and R may be determined, for example, as follows:

$$\gamma_R = \frac{E_s(\|g_{B \to R}\|^2 + \|g_{A \to R}\|^2)}{\sigma_0^2} \quad (1)$$

$$\gamma_A = \frac{E_s \frac{\|g_{B \to R}\|^2}{\|g_{B \to R}\|^2 + \|g_{A \to R}\|^2 + \sigma_0^2}}{\|g_{R \to A}\|^2 \sigma_0^2 + \sigma_B^2 + \sigma_0^2} \quad (2)$$

$$\gamma_B = \frac{E_s \frac{\|g_{A \to R}\|^2}{\|g_{A \to R}\|^2 + \|g_{B \to R}\|^2 + \sigma_0^2}}{\|g_{R \to B}\|^2 \sigma_0^2 + \sigma_A^2 + \sigma_0^2} \quad (3)$$

wherein $\sigma_0^2$ denotes a noise power at the receiver; $\sigma_A^2$ and $\sigma_B^2$ denote residual interference after cancellation; and $E_S$ denotes the transmission power of all nodes.

In some demonstrative embodiments, space-time coding or repetition coding may be added to the broadcast transmission from node 110 to nodes 102 and 106. In some embodiments, the transmission power of the relay node 110 may be increased and/or coding redundancy may be added to the broadcast transmission from node 110. The coding may be performed in space and/or time domains. For example, node 110 may repeat the broadcast of some portion of the superimposed signal received by node 110 during time slot T1. In one example, node 110 may use the received superimposed symbols as input to a space-time block code; encode the input symbols; and broadcast the coded symbols. In another example, node 110 may puncture the received symbols and broadcast the remaining transmission, e.g., if the transmission power of node 110 is higher than the transmission power of the nodes, which transmitted the packets a and c. In some embodiments, multiple relay nodes may be implemented to perform space-time coding by sharing all the antennas on each relay node.

In some demonstrative embodiments, coding may increase the transmission time and thus reduce throughput. In some embodiments, multiple relay nodes may be used to boost the signal power. For example, two or more relay nodes may be identified, e.g., before the transmission of the packets a and c. The relay nodes may receive and broadcast the received signal simultaneously.

Figure 2A:
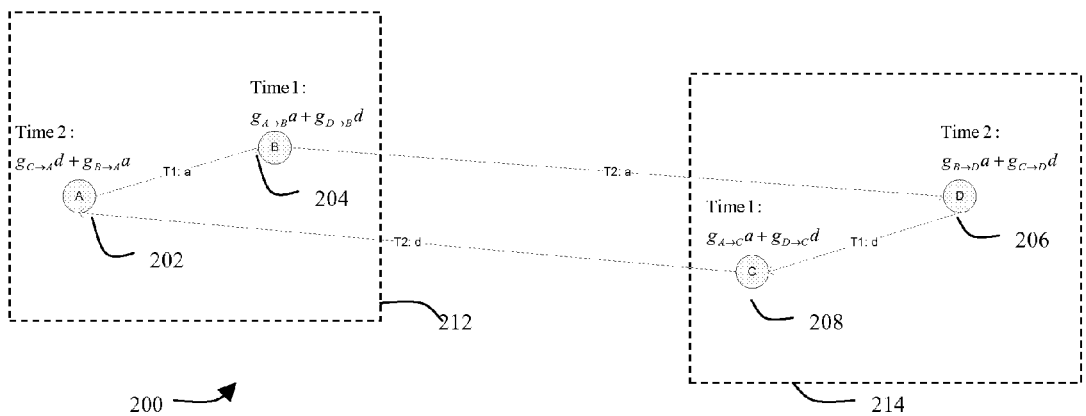
FIG. 2a is a schematic block diagram illustration of a wireless communication system in accordance with another demonstrative embodiment.

Reference is made to FIG. 2A, which schematically illustrates a bidirectional wireless communication system 200 in accordance with another demonstrative embodiment.

In some demonstrative embodiments, communication system 200 may include a first node 202, denoted A; a second node 204, denoted B; a third node 206, denoted D; and a fourth node 208, denoted C, as described in detail below.

In some demonstrative embodiments, nodes 202 and 204 may include neighboring nodes as part of a first neighborhood 212, e.g., a first wireless communication cell; and nodes 206 and 208 may include neighboring nodes as part of a second neighborhood 214, e.g., a second wireless communication cell.

In some demonstrative embodiments, system 200 may exchange a first packet, denoted a, from node 202 to node 206; and a second packet, denoted d, from node 206 to node 202, for example, during two communication time slots, e.g., as described below.

In some demonstrative embodiments a data rate within neighborhoods 212 and 214 may be much higher than a data rate between neighborhoods 212 and 214, e.g., due to path loss. For example, within neighborhoods 212 and 214 the modulation and/or number of spatial data streams may be 256 QAM and 4, respectively, while the modulation and/or number of spatial data streams between neighborhoods 212 and 214 may be QPSK and 1, respectively. Accordingly, a data rate within neighborhoods 212 and 214 may be, for example, at least ten times higher than the data rate between neighborhoods 212 and 214. Accordingly, the time required for performing the transmission of the packets a and d may be dominated by the transmission time between neighborhoods 212 and 214, while the transmission time within neighborhoods 212 and 214 may be negligible. In some demonstrative embodiments, system 200 may enable increasing the exchange throughput between nodes of neighborhoods 212 and 214, e.g., compared to an exchange throughput achieved by conventional Time Division Duplexing (TDD) communication methods.

In some demonstrative embodiments, during a first time slot, denoted T1, nodes 202 and 206 may transmit the packets a and d, respectively, to nodes 204 and 208, respectively, e.g., substantially simultaneously. Nodes 202 and 206 may transmit the packets a and d using high data rates. MIMO transmission may be employed due to high SNR. It is noted that the requirement of error vector magnitude (EVM) does not increase with the number of data streams. On the other hand, decoding a bigger QAM symbol may require higher SNR, which also requires a better EVM at the transmitter ends. Since typical EVM is in the range of −35 dB, increasing number of spatial streams may be a better way to exploit SNR higher than about 35 dB. The transmissions of the packets a and d from nodes 202 and 206 may be performed according to a time division scheme, or simultaneously, e.g., if interference from the other neighborhood is small. The neighbor nodes 204 and 208 may be selected to optimize the high two-way exchange throughput.

In some demonstrative embodiments, neighbor nodes 204 and 208 may decode the data of packets a and d, respectively. Nodes 204 and 208 encodes and/or modulates the decoded packets a and d, respectively, for example, using a lower code rate and/or a lower constellation, e.g., compared to the code rate and/or constellation of the transmissions received from nodes 202 and 206.

In some demonstrative embodiments, during a second time slot, denoted T2, nodes 204 and 208 may simultaneously transmit the encoded packets a and d to nodes 206 and 202, respectively. A small number of data streams, e.g. one, may be used due, for example, to low SNR over the link between neighborhood 212 and 214.

In some demonstrative embodiments, strong inference may be received from the neighbor node transmission when the destination node receives its desired data. For example, during time slot T2, node 204 sends packet a to node 206 and node 208 sends packet d to node 202. Accordingly, during the time slot T2 the transmission from node 208 may cause interference to the transmission being received at node 206. However, node 206 may cancel the interference from node 208 using the data of packet d, which is known to node 206, e.g., as described above. Accordingly, node 206 may detect packet a based on the transmission from node 204 and the known packet d. Similarly, node 202 may detect the packet d forwarded by node 208, e.g., using the known packet a to cancel the interference from node 204.

Figure 2B:
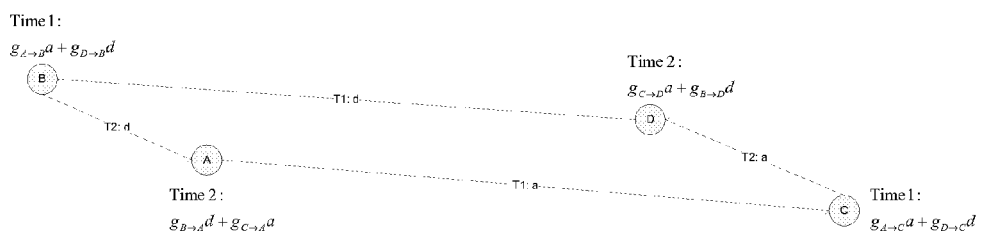
FIG. 2b is a schematic block diagram illustration of a wireless communication system in accordance with yet another demonstrative embodiment.

FIG. 2B schematically illustrates a bidirectional wireless communication system in accordance with a yet another demonstrative embodiment. The system of FIG. 2B is similar to system 210 (FIG. 2A), except that the two-way transmission between the two neighborhoods is performed during the time slot T1, and the message forward inside the neighborhood is performed during the time slot T2. For example, during time slot T1, nodes A and D simultaneously transmit the packets a and d, respectively, to nodes C and D, respectively; and during the time slot T2, nodes C and B simultaneously forward the packets a and d, respectively, to nodes D and A, respectively.

Referring back to FIG. 2A, in some demonstrative embodiments, nodes 202 and 204 may each have four antennas. During time slot T1 node 202 may use all four antennas to transmit four streams of data representing the packet a to node 204. Node 204 may detect the packet a, for example, by estimating the channel between nodes 202 and 204.

In some demonstrative embodiments, during the time slot T2, node 204 may transmit the detected packet a to node 206, for example, by using all four antennas of node 204 to send only one data stream, e.g., due to low SNR. Node 204 may additionally form three radiation nulls directed to three antennas of node 202 ("the nulled antennas"). Accordingly, node 202 may receive substantially no interference from node 204 via the three nulled antennas of node 202. Node 202 may use the three nulled antennas to receive the transmission of packet d from node 208. Using only the three nulled antennas out of the four antennas of node 202 may result in a reduction in the receive power at node 202, e.g., by 1.3 dB. However, the two-way multiplexing gain allowed by system 210 may more than compensate the SNR loss in term of throughput.

In some demonstrative embodiments, node 204 may null distinct three-antenna groups of the four antennas of node 202. Node 202 may uses the alternately nulled antennas to receive the transmission of packet d from node 208, while node 204 may use a different spatial channel to transmit the single stream representing the packet a to node 206. Therefore, both node 202 and node 204 may maintain spatial diversity.

In some demonstrative embodiments node 202 may perform receive nulling during the time slot T2. For example, node 204 may transmit the packet a to node 206 over at least one spatial channel, e.g., one or two beamformed channels; and node 202 may null the at least one spatial channel when receiving the transmission of the packet d from node 208. Such receive nulling may reduce, for example, the received SNR by 0.9 dB, e.g., based on a Non-Line-Of-Sight (NLOS) channel model of WLAN. This reduction may be negligible compared to the throughput doubling enabled by system 210. The receive nulling at node 202 may be performed, for example, at analog level, e.g., before Analog-to-Digital-Conversion (ADC), in order to reduce a dynamic range of the ADC.

In some demonstrative embodiments, nodes 204 and/or 208 may be selected to be located between nodes 202 and 206. Such a selection may reduce the EVM requirement and/or the dynamic range of the ADC. For example, the requirement and/or dynamic range of the ADC may be reduces as the signal strengths from node 204 or 208 to nodes 202 and 206 get close.

Figure 3A:
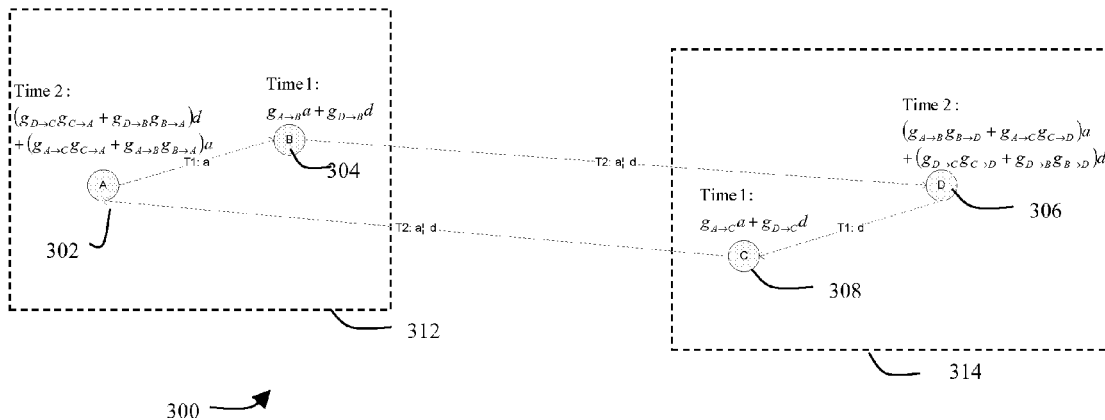
FIG. 3a is a schematic block diagram illustration of a wireless communication system in accordance with yet another demonstrative embodiment.

Reference is now made to FIG. 3A, which schematically illustrates a bidirectional wireless communication system 300 in accordance with yet another demonstrative embodiment.

In some demonstrative embodiments, communication system 300 may include a first node 302, denoted A; a second node 304, denoted B; a third node 306, denoted D; and a fourth node 308, denoted C, as described in detail below.

In some demonstrative embodiments, nodes 302 and 304 may include neighboring nodes as part of a first neighborhood 312, e.g., a first wireless communication cell; and nodes 306 and 308 may include neighboring nodes as part of a second neighborhood 314, e.g., a second wireless communication cell.

In some demonstrative embodiments, system 300 may exchange a first packet, denoted a, from node 302 to node 306; and a second packet, denoted d, from node 306 to node 302, for example, during two communication time slots, e.g., as described below.

In some demonstrative embodiments, during a first time slot, denoted T1, nodes 302 and 306 may transmit the packets a and d, respectively, to nodes 304 and 308, respectively, e.g., substantially simultaneously. Nodes 302 and 306 may transmit the packets a and d using high data rates. MIMO transmission may be employed due to high SNR. The transmissions of the packets a and d from nodes 302 and 306 may be performed according to a time division scheme, or simultaneously, e.g., if interference from the other neighborhood is small. The neighbor nodes 304 and 308 may be selected to optimize the high two-way exchange throughput.

In some demonstrative embodiments, during the time slot T1 node 304 may receive, for example, a superimposition ("the first superimposed transmission") of the packets a and d, e.g., $g_{A \to B}a + g_{D \to B}d$, wherein $g_{A \to B}$ denotes a channel response between the nodes A and B, and $g_{D \to B}$ denotes a channel response between the nodes D and B; and node 308 may receive a superimposition ("the second superimposed transmission") of the packets a and d, e.g., $g_{A \to C}a + g_{D \to C}d$, wherein $g_{A \to C}$ denotes a channel response between the nodes A and C, and $g_{D \to C}$ denotes a channel response between the nodes D and C.

According to some embodiments, nodes 304 and 308 may not be required to decode the data of packets a and d, respectively, e.g., as described below. The packet a may be overheard by the node D, and/or the packet d may be overheard by the node B, e.g., since $g_{D \to B}d$ is included in $g_{A \to B}a + g_{D \to B}d$, and the overheard term $g_{A \to C}a$ is included in $g_{A \to C}a + g_{D \to C}d$ In some demonstrative embodiments, during a second time slot, denoted T2, nodes 304 and 308 may amplify and forward the first and second superimposed transmissions, respectively, to nodes 306 and 302, respectively. The communication links between nodes 304 and 306, and between nodes 308 and 302 may be relatively poor compared to communication links between nodes 302 and 304 and between 306 and 308, e.g., as described above. In some demonstrative embodiments, nodes 304 and/or 308 may code an analog signal or symbol of the forwarded superimposed transmissions by simple repetition and/or space-time codes, e.g., to increase SNR and/or reliability. For example, nodes 304 and/or 308 may use a received, base-band, analog signal on each antenna as an input symbol to a repetition code or space-time code.

In some demonstrative embodiments, node 302 may detect the packet d based, for example, on the second superimposed transmission forwarded by node 308 and the data of packet a, which is known to node 302; and node 306 may detect the packet a based, for example, on the first superimposed transmission forwarded by node 304 and the data of packet d, which is known to node 306. For example, during the time slot T2 node 302 may receive the forwarded transmission $(g_{D \to C}g_{C \to A} + g_{D \to B}g_{B \to A})d + (g_{A \to C}g_{C \to A} + g_{A \to B}g_{B \to A})a$; and node 306 may receive the forwarded transmission $(g_{A \to B}g_{B \to D} + g_{A \to C}g_{C \to D})a + (g_{D \to C}g_{C \to D} + g_{D \to B}g_{B \to D})d$.

Node 302 may estimate, for example, the interference channel responses $g_{A \to C}g_{C \to A} + g_{A \to B}g_{B \to A}$, by performing the interference mitigation described above with reference to FIG. 1. Node 302 may then remove the interference from the forwarded transmission using the estimated channel responses and the data of packet a. After interference cancellation, node 302 may use the remaining signal to decode the data of packet d. Node 306 may perform similar interference mitigation to decode the data of packet a.

Figure 3B:
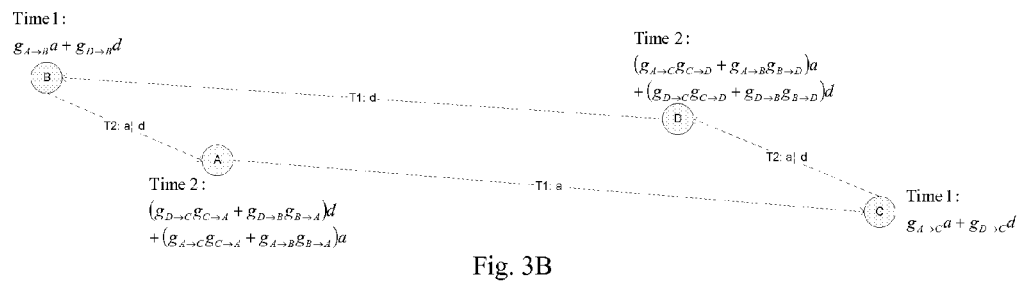
FIG. 3b is a schematic block diagram illustration of a wireless communication system in accordance with yet another demonstrative embodiment.

FIG. 3B schematically illustrates a bidirectional wireless communication system in accordance with a yet another demonstrative embodiment. The system of FIG. 3B is similar to system 310 (FIG. 3A), except that the two-way transmission between the two neighborhoods is performed during the time slot T1, and the message forward inside the neighborhood is performed during the time slot T2.

In some demonstrative embodiments, nodes 302, 304, 306 and/or 308 may implement one or more of the nulling schemes described above with reference to FIG. 2A, e.g., in order to avoid high requirements on EVM and/or dynamic range.

Figure 4:
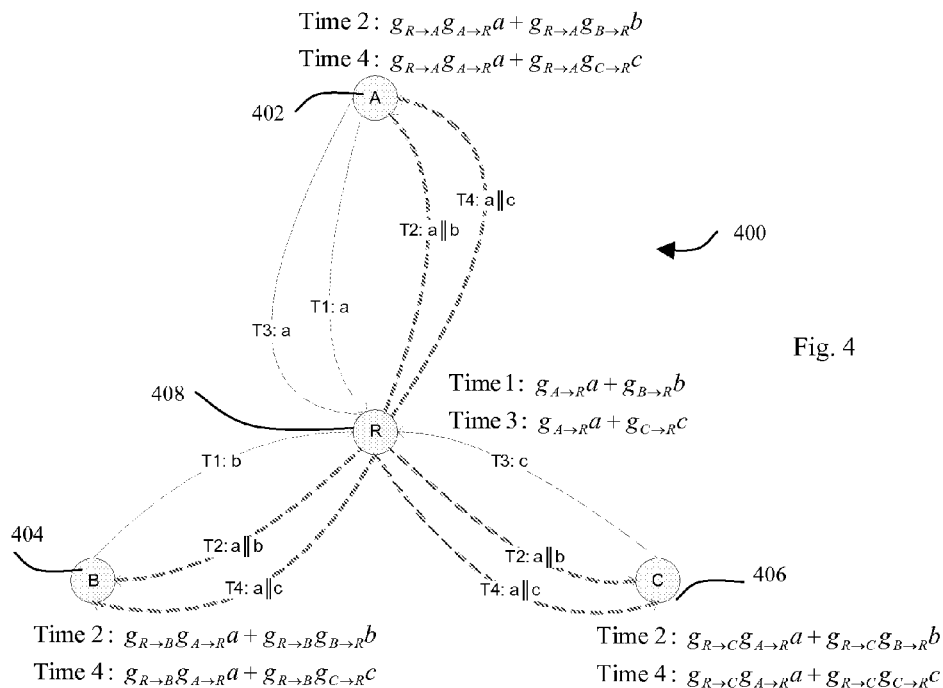
FIG. 4 is a schematic block diagram illustration of a wireless communication system in accordance with yet another demonstrative embodiment.

Reference is made to FIG. 4, which schematically illustrates a bidirectional wireless communication system 400 in accordance with yet another demonstrative embodiment.

In some demonstrative embodiments, communication system 400 may include a first node 402, denoted A; a second node 404, denoted B; a third node 406, denoted C; and a relay node 408, denoted R, as described in detail below.

In some demonstrative embodiments, system 400 may exchange a first packet, denoted a, from node 402 to nodes 404 and 406; a second packet, denoted b, from node 404 to nodes 402 and 406; and a third packet, denoted c, from node 406 to nodes 402 and 404, via relay node 408, for example, during four communication time slots, e.g., as described below.

In some demonstrative embodiments, during a first time slot, denoted T1, nodes 402 and 404 may transmit the packets a and b, respectively, to relay node 408, e.g., substantially simultaneously. Relay node 408 may receive the superimposed transmission $g_{A \to R}a + g_{B \to R}b$ ("the first superimposed transmission"). In some embodiments, node 406 may overhear a superimposed transmission. Such overhearing may improve the performance of system 400, e.g., by using H-ARQ combining as described above with reference to FIG. 1.

In some demonstrative embodiments, during a second time slot, denoted T2, relay node 408 may amplify and broadcast the first superimposed transmission to nodes 402, 404 and 406. Repetition coding or space-time coding may be implemented. Additionally or alternatively, multiple relay nodes may be used to receive and transmit simultaneously to increase transmission power, e.g., as described above.

In some demonstrative embodiments, nodes 402, 404 and 406 may receive transmissions $g_{R \to A}g_{A \to R}a + g_{R \to A}g_{B \to R}b$, $g_{R \to B}g_{A \to R}a + g_{R \to B}g_{B \to R}b$ and $g_{R \to C}g_{A \to R}a + g_{R \to C}g_{B \to R}b$, respectively. Nodes 402 and 603 may detect the packets b and a, respectively, for example, by applying the interference mitigation technique described above to the received transmissions $g_{R \to A}g_{A \to R}a + g_{R \to A}g_{B \to R}$ and $g_{R \to B}g_{A \to R}a + g_{R \to B}g_{B \to R}b$, respectively.

In some demonstrative embodiments, during a third time slot, denoted T3, nodes 402 and 406 may transmit the packets a and c, respectively, to relay node 408, e.g., substantially simultaneously. Relay node 408 may receive the superimposed transmission $g_{A \to R}a + g_{C \to R}c$ ("the second superimposed transmission").

In some demonstrative embodiments, during a fourth time slot, denoted T4, relay node 408 may amplify and broadcast the second superimposed transmission to nodes 402, 404 and 406.

In some demonstrative embodiments, nodes 402, 404 and 406 may receive the transmissions $g_{R \to A}g_{A \to R}a + g_{R \to A}g_{C \to R}c$, $g_{R \to B}g_{A \to R}a + g_{R \to B}g_{C \to R}c$ and $g_{R \to C}g_{A \to R}a + g_{R \to C}g_{C \to R}c$, respectively. Based on the transmission $g_{R \to A}g_{A \to R}a + g_{R \to A}g_{C \to R}c$, node 406 may remove the interference from packet c and detect the packet a, e.g., as described above. In addition, node 406 may remove the interference from packet a in the previously received transmission $g_{R \to C}g_{A \to R}a + g_{R \to C}g_{B \to R}b$, e.g., using the detected packet a, to detect the packet b. Based on the transmission $g_{R \to A}g_{A \to R}a + g_{R \to A}g_{C \to R}c$, node 402 may remove the interference from packet a and detect packet c. Based on the transmission $g_{R \to A}g_{A \to R}a + g_{R \to B}g_{C \to R}c$ and the detected packet a, node 404 may remove the interference from packet a and detect packet c.

In other embodiments other exchange schemes may be implemented to exchange the packets a, b, and c between nodes 402, 404, and 406. For example, nodes 402, 404 and 406 may simultaneously transmit packets a, b, and c, respectively, to relay node 406 during the time slot T1. In the time slot T4 nodes 404 and 406 may simultaneously transmit packets b and (-c), respectively, wherein (-c) is a phase-reversion of the packet c.

Figure 5:
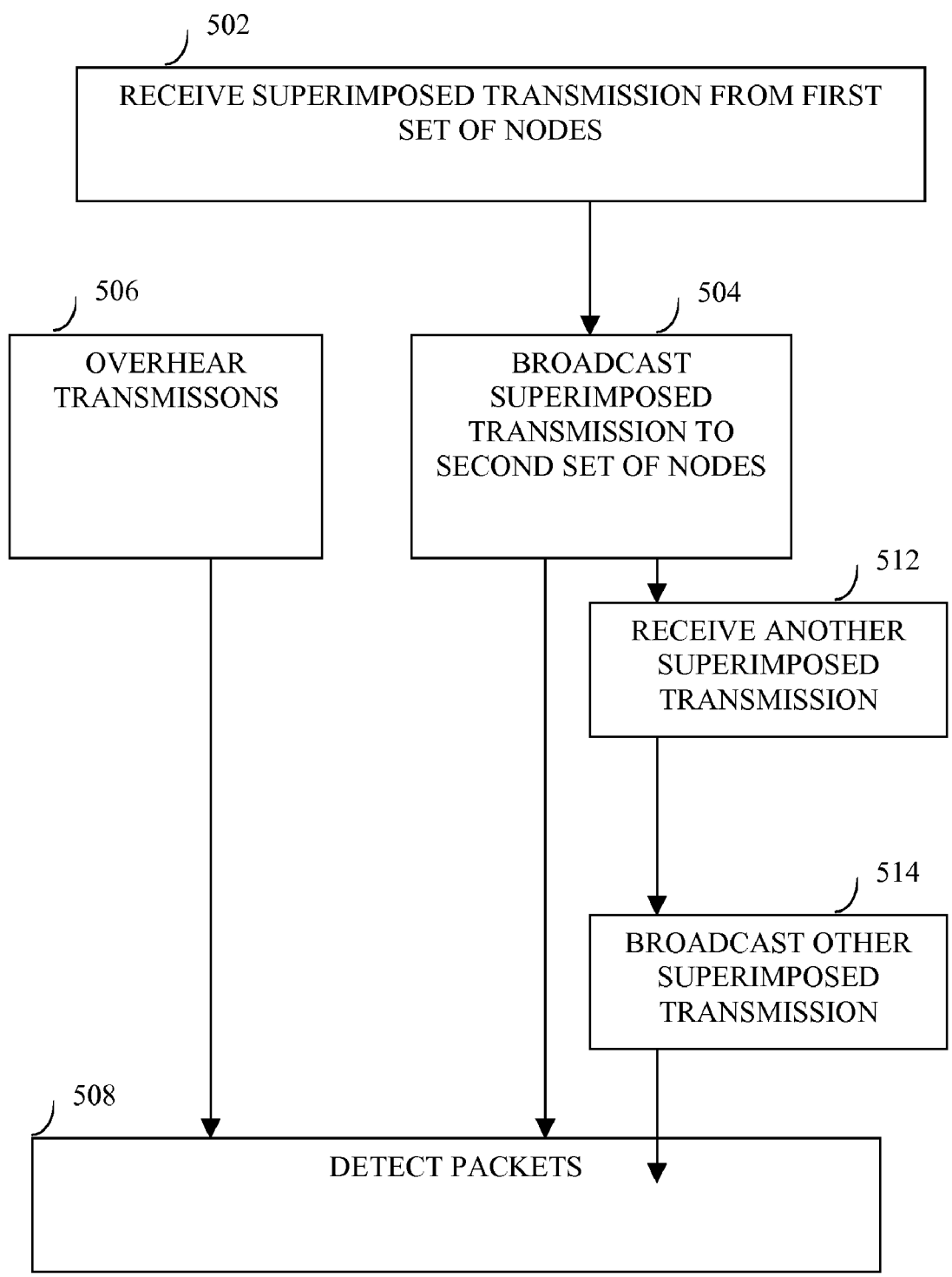
FIG. 5 is a schematic flow-chart illustration of a method of wireless communication in accordance with one demonstrative embodiment.

Reference is made to FIG. 5, which schematically illustrates a flow chart of a method of wireless communication in accordance with one demonstrative embodiment. Although embodiments of the invention are not limited in this respect, in some demonstrative embodiments one or more operations of the method of FIG. 5 may be implemented by system 100 (FIG. 1) and/or system 400 (FIG. 4).

As indicated at block 502, the method may include receiving by a wireless communication relay node a superimposed transmission corresponding to two transmissions from a first set of two wireless communication nodes.

As indicated at block 504, the method may also include broadcasting from the relay node to a second set of two or more wireless communication nodes a broadcast transmission including the superimposed transmission. The second set of wireless communication nodes may include at least one wireless communication node, which is not included in the first set of wireless communication nodes.

In some demonstrative embodiments, the first set includes first and second wireless communication nodes, and the second set includes third and fourth wireless communication nodes. In one example, the two transmissions include a first transmission from the first node to the relay node including a first packet intended for the third node; and a second transmission from the second node to the relay node including a second packet intended for the fourth node. For example, relay node 110 (FIG. 1) may receive a superimposed transmission corresponding to transmissions from nodes 102 (FIG. 1) and 108 (FIG. 1); and transmit the broadcast transmission to nodes 104 (FIG. 1) and 106 (FIG. 1), e.g., as described above.

As indicated at block 506, in some demonstrative embodiments the method may also include overhearing the first and second transmissions by the fourth and third nodes, respectively. For example, nodes 104 (FIG. 1) and 106 (FIG. 1) may overhear the first and second transmissions.

In some demonstrative embodiments, the first set includes first and second wireless communication nodes, and the second set includes the first and second wireless communication nodes and a third wireless communication node. In one example, the two transmissions include a first transmission from the first node to the relay node including a first packet, and a second transmission from the second node to the relay node including a second packet. For example, relay node 408 (FIG. 4) may receive the first superimposed transmission from nodes 402 (FIG. 4) and 404 (FIG. 4), e.g., as described above with reference to FIG. 4.

As indicated at block 512, the method may also include receiving by the relay node another superimposed transmission corresponding to the first transmission and to a third transmission including a third packet from the third wireless communication node. For example, relay node 408 (FIG. 4) may receive the second superimposed transmission from nodes 402 (FIG. 4) and 406 (FIG. 4), e.g., as described above with reference to FIG. 4.

As indicated at block 514, the method may also include broadcasting from the relay node to the first, second and third wireless communication nodes a broadcast transmission including the other superimposed transmission. For example, relay node 408 (FIG. 4) may broadcast the second superimposed transmission to nodes 402 (FIG. 4), 404 (FIG. 4) and 406 (FIG. 4), e.g., as described above with reference to FIG. 4.

As indicated at block 508, the method may also include detecting at least first and second packets exchanged by the nodes. In one example, the method may include detecting the first packet at the third node based on the first transmission and the broadcast transmission; and detecting the second packet at the fourth node based on the second transmission and the broadcast transmission, e.g., as described above with reference to FIG. 1. In another example, the method may include detecting the second and third packets at the first node; detecting the first and third packets at the second node; and detecting the first and second packets at the third node, e.g., as described above with reference to FIG. 4.

Other suitable operations may be used, and other suitable orders of operation may be used.

Figure 6:
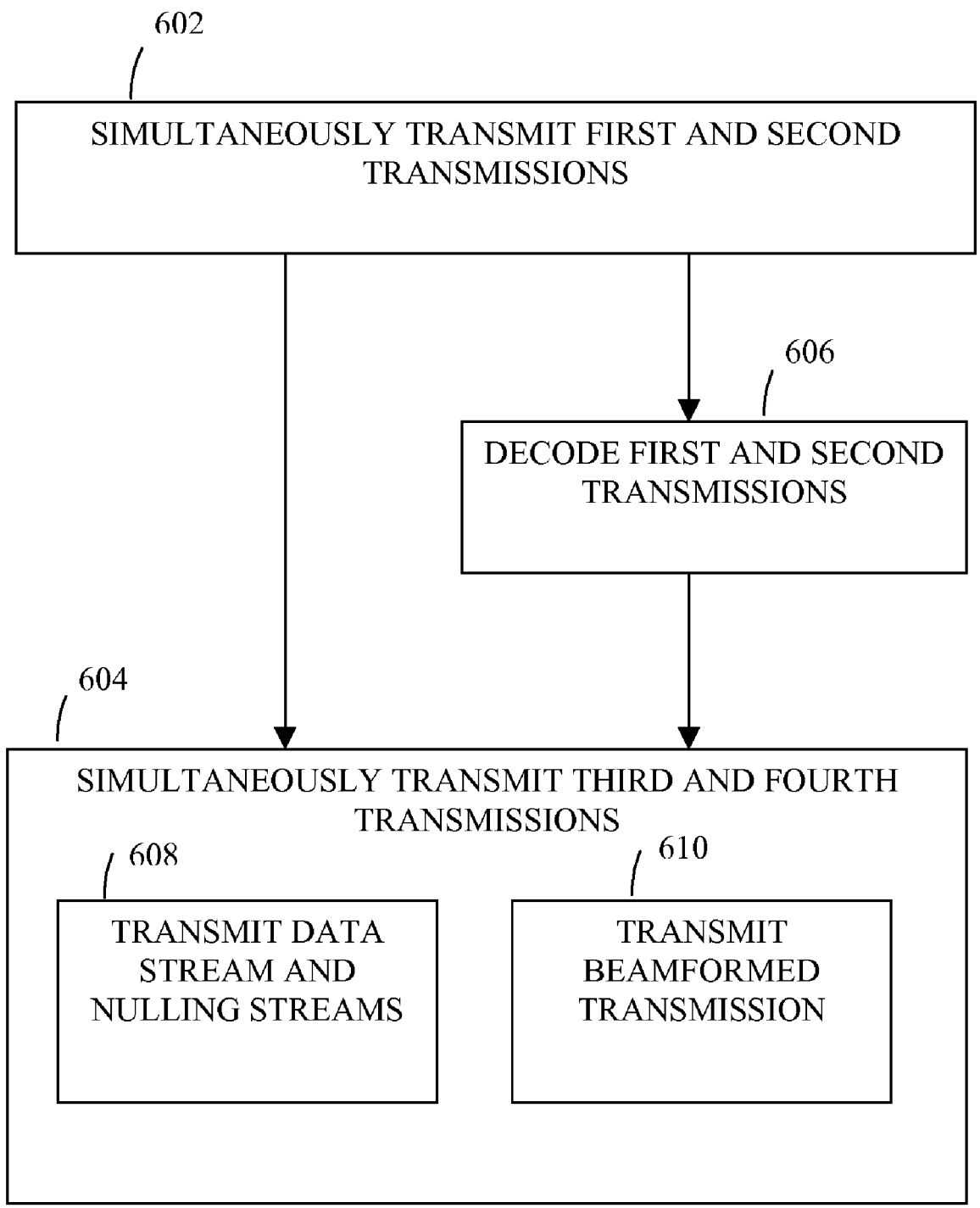
FIG. 6 is a schematic flow-chart illustration of a method of wireless communication in accordance with another demonstrative embodiment.

Reference is made to FIG. 6, which schematically illustrates a flow chart of a method of wireless communication in accordance with another demonstrative embodiment. Although embodiments of the invention are not limited in this respect, in some demonstrative embodiments one or more operations of the method of FIG. 5 may be implemented by the systems of FIGS. 2A, 2B, 3A and/or 3B.

As indicated at block 602, the method may include simultaneously transmitting a first transmission from a first node to a second node and a second transmission from a third node to a fourth node, wherein the first transmission comprises a first packet intended for the third node, and wherein the second transmission comprises a second packet intended for the first node.

As indicated at block 604, the method may also include simultaneously transmitting a third transmission from the second node to the third node and a fourth transmission from the fourth node to the first node, wherein the third transmission represents the first packet, and wherein the fourth transmission represents the second packet.

In some demonstrative embodiments, the third transmission may include a superimposed transmission of the first and second transmissions received at the second node, and the fourth transmission may include a superimposed transmission of the first and second transmissions received at the fourth node, e.g., as described above with reference to FIGS. 3A and/or 3B.

As indicated at block 606, in some embodiments the method may include decoding the first transmission at the second node to determine a first decoded packet; and decoding the second transmission at the fourth node to determine a second decoded packet. The third and fourth transmissions may include the first and second decoded packets, respectively, e.g., as described above with reference to FIGS. 2A and/or 2B.

As indicated at block 608, in some embodiments transmitting the third transmission may include transmitting from the second node to the third node at least one data stream representing the first packet; and transmitting from the second node a plurality of nulling streams to be received by a respective plurality of antennas of the first node, wherein the plurality of antennas are to receive the fourth transmission, e.g., as described above with reference to FIG. 2A.

As indicated at block 610, in some embodiments transmitting the third transmission may include transmitting from the second node to the third node at least one beam-formed transmission representing the first packet over at least one beam-formed channel, respectively. The method may also include performing receive nulling by the first node over the at least one beam-formed channel, e.g., as described above with reference to FIG. 2A.

Some embodiments, for example, may take the form of an entirely hardware embodiment, an entirely software embodiment, or an embodiment including both hardware and software elements. Some embodiments may be implemented in software, which includes but is not limited to firmware, resident software, microcode, or the like.

Furthermore, some embodiments may take the form of a computer program product accessible from a computer-usable or computer-readable medium providing program code for use by or in connection with a computer or any instruction execution system. For example, a computer-usable or computer-readable medium may be or may include any apparatus that can contain, store, communicate, propagate, or transport the program for use by or in connection with the instruction execution system, apparatus, or device.

In some embodiments, the medium may be an electronic, magnetic, optical, electromagnetic, infrared, or semiconductor system (or apparatus or device) or a propagation medium. Some demonstrative examples of a computer-readable medium may include a semiconductor or solid-state memory, magnetic tape, a removable computer diskette, a RAM, a ROM, a rigid magnetic disk, and an optical disk. Some demonstrative examples of optical disks include CD-ROM, CD-R/W, and DVD.

In some embodiments, a data processing system suitable for storing and/or executing program code may include at least one processor coupled directly or indirectly to memory elements, for example, through a system bus. The memory elements may include, for example, local memory employed during actual execution of the program code, bulk storage, and cache memories which may provide temporary storage of at least some program code in order to reduce the number of times code must be retrieved from bulk storage during execution.

In some embodiments, input/output or I/O devices (including but not limited to keyboards, displays, pointing devices, etc.) may be coupled to the system either directly or through intervening I/O controllers. In some embodiments, network adapters may be coupled to the system to enable the data processing system to become coupled to other data processing systems or remote printers or storage devices, for example, through intervening private or public networks. In some embodiments, modems, cable modems and Ethernet cards are demonstrative examples of types of network adapters. Other suitable components may be used.

Functions, operations, components and/or features described herein with reference to one or more embodiments, may be combined with, or may be utilized in combination with, one or more other functions, operations, components and/or features described herein with reference to one or more other embodiments, or vice versa.

While certain features of the invention have been illustrated and described herein, many modifications, substitutions, changes, and equivalents may occur to those skilled in the art. It is, therefore, to be understood that the appended claims are intended to cover all such modifications and changes as fall within the true spirit of the invention.

What is claimed is:

1. A method comprising:
receiving by a wireless communication relay node a superimposed transmission corresponding to first and second transmissions from first and second wireless communication nodes, respectively, wherein said first transmission includes a first packet intended at least for a third wireless communication node; and
broadcasting a broadcast transmission including said superimposed transmission from said relay node to a set of two or more wireless communication nodes including said third wireless communication node.

2. The method of claim 1, wherein said set includes a fourth wireless communication node.

3. The method of claim 2, wherein said second transmission includes a second packet intended for said fourth node.

4. The method of claim 3 comprising:
overhearing said first and second transmissions by said fourth and third nodes, respectively;
detecting said first packet at said third node based on said first transmission and the broadcast transmission; and
detecting said second packet at said fourth node based on said second transmission and the broadcast transmission.

5. The method of claim 1, wherein said set includes said first and second wireless communication nodes.

6. The method of claim 5, wherein said first packet is intended for said second and third nodes, and wherein said second transmission includes a second packet intended for said first and third nodes.

7. The method of claim 6 comprising:
receiving by said relay node another superimposed transmission corresponding to said first transmission and to a third transmission including a third packet from said third wireless communication node; and
broadcasting from said relay node to said first, second and third wireless communication nodes a broadcast transmission including the other superimposed transmission.

8. The method of claim 7 comprising:
detecting said second and third packets at said first node;
detecting said first and third packets at said second node; and
detecting said first and second packets at said third node.

* * * * *

UNITED STATES PATENT AND TRADEMARK OFFICE
CERTIFICATE OF CORRECTION

| | | |
|---|---|---|
| PATENT NO. | : 8,005,033 B2 | |
| APPLICATION NO. | : 12/023057 | |
| DATED | : August 23, 2011 | |
| INVENTOR(S) | : Qinghua Li et al. | |

It is certified that error appears in the above-identified patent and that said Letters Patent is hereby corrected as shown below:

Sheet 3 of 4, in Figure 5, Box No. 506, line 2, delete "TRANSMISSONS" and insert -- TRANSMISSIONS --, therefor.

Signed and Sealed this
Twenty-seventh Day of December, 2011

David J. Kappos
*Director of the United States Patent and Trademark Office*